US012683939B2

(12) United States Patent
Axer et al.

(10) Patent No.: US 12,683,939 B2
(45) Date of Patent: Jul. 14, 2026

(54) DEVICE AND A METHOD FOR THE DEVICE

(71) Applicant: NXP B.V., Eindhoven (NL)

(72) Inventors: Philip Axer, Hamburg (DE); Martijn Martinus Hendrikus van der Cruijsen, Wanroij (NL)

(73) Assignee: NXP B.V., Eindhoven (NL)

( * ) Notice: Subject to any disclaimer, the term of this patent is extended or adjusted under 35 U.S.C. 154(b) by 175 days.

(21) Appl. No.: 18/639,724

(22) Filed: Apr. 18, 2024

(65) Prior Publication Data

US 2024/0364664 A1    Oct. 31, 2024

(30) Foreign Application Priority Data

Apr. 28, 2023    (EP) ..................................... 23170592

(51) Int. Cl.
H04L 9/40        (2022.01)
(52) U.S. Cl.
CPC .............................. H04L 63/0428 (2013.01)

(58) Field of Classification Search
CPC ................................................... H04L 63/0428
See application file for complete search history.

(56) References Cited

U.S. PATENT DOCUMENTS

| | | | | |
|---|---|---|---|---|
| 10,931,391 B2 * | 2/2021 | Mallela | ................. | H04J 3/0667 |
| 12,271,493 B2 * | 4/2025 | Quinlan | ................ | G06F 3/0622 |
| 2007/0198656 A1 * | 8/2007 | Mazzaferri | .......... | G06F 9/5055 |
| | | | | 709/218 |
| 2010/0191525 A1 * | 7/2010 | Rabenko | ............... | H04M 7/125 |
| | | | | 704/211 |
| 2013/0212334 A1 * | 8/2013 | Michalak | ................. | G06F 9/38 |
| | | | | 711/137 |
| 2016/0378550 A1 * | 12/2016 | Bertran Monfort | .. | G06F 9/4843 |
| | | | | 718/102 |
| 2020/0393565 A1 * | 12/2020 | Amr | ...................... | G01S 7/4865 |
| 2022/0116373 A1 | 4/2022 | Soo et al. | | |

FOREIGN PATENT DOCUMENTS

EP            3840255 A1      6/2021

* cited by examiner

*Primary Examiner* — Kristie D Shingles

(57) ABSTRACT

The present invention relates to device for compensating variations in run time of a word of a frame. The invention also relates to a method for the device.

19 Claims, 4 Drawing Sheets

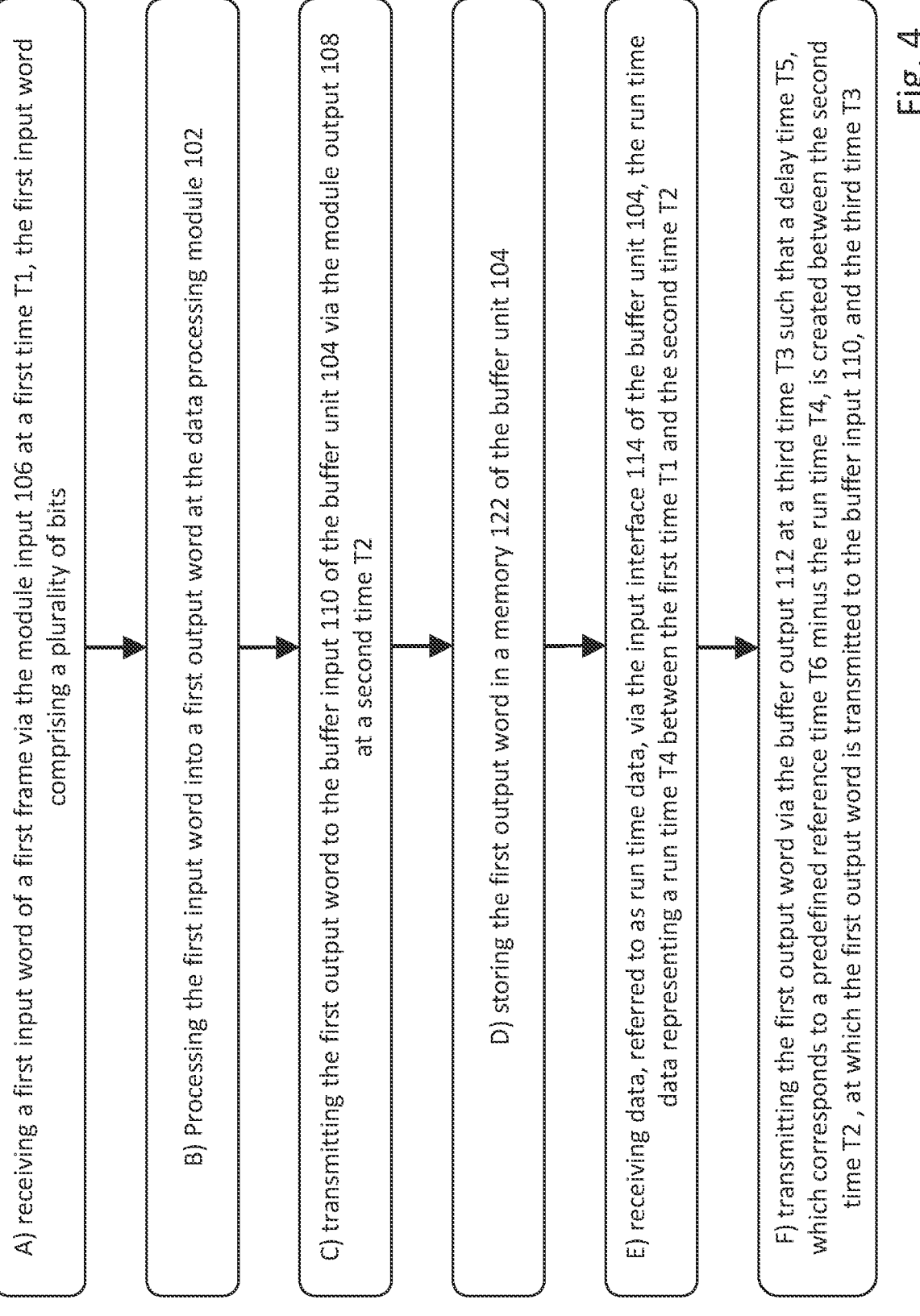

A) receiving a first input word of a first frame via the module input 106 at a first time T1, the first input word comprising a plurality of bits B) Processing the first input word into a first output word at the data processing module 102

C) transmitting the first output word to the buffer input 110 of the buffer unit 104 via the module output 108 at a second time T2

D) storing the first output word in a memory 122 of the buffer unit 104

E) receiving data, referred to as run time data, via the input interface 114 of the buffer unit 104, the run time data representing a run time T4 between the first time T1 and the second time T2

F) transmitting the first output word via the buffer output 112 at a third time T3 such that a delay time T5, which corresponds to a predefined reference time T6 minus the run time T4, is created between the second time T2, at which the first output word is transmitted to the buffer input 110, and the third time T3

Fig. 4

DEVICE AND A METHOD FOR THE DEVICE

CROSS-REFERENCE TO RELATED APPLICATIONS

This application claims priority under 35 U.S.C. § 119 to patent application Ser. No. 23/170,592.2, filed Apr. 28, 2023, the contents of which are incorporated by reference herein

TECHNICAL FIELD

The present disclosure relates to a device and a method for the device.

BACKGROUND

Several devices, especially electronic devices, can be coupled via a network connection. Each device may comprise an internal clock. The internal clocks of the devices may help or even be necessary to ensure that certain operations are performed efficiently over the network connection, such as the transmission of messages over the network connection via frames from one device to another device. A frame may also be referred to as a packet, or vice versa. Efficient transmission can be achieved if the internal clocks of the device are synchronized. Synchronization can be performed over the network connection, such as by an exchange of messages between the devices. Each message may contain information about the internal clock of the sender device. The transmission of messages may involve latency, depending on the design of the network connection between two devices, and the duration of the latency may vary. The latency is often subject to some variation in its duration. Preferably, latency refers to the running time of a frame. Latency may refer to the running time of the frame between two (arbitrary) locations. In an example, the latency may refer to a running time of a transmission of a frame over the network connection between two devices. The latency may depend on the network connection and/or the protocols applied and/or the devices used. In an example, the latency of a frame for transmission from a transmitter device to a receiver device may vary considerably if the IEEE 802.3 Ethernet protocol is used. The synchronization of the internal clocks of the devices may be improved, for example, by using specific protocols and/or strategies. In an example, the use of IEEE 1588 Precision Time Protocol (PTP) may improve and/or ensure synchronization of the internal clocks of the devices. In addition, strategies may be used to estimate the latency of transmitting specific frames between two devices over the network connection. These strategies may be based on timestamps of the frames.

To improve the security of transmitting frames over a network connection, cryptographic techniques can be used that are applied to the frames or at least a portion of the frames. By applying the IEEE 802.1AE MACsec protocol, frames can be encrypted by a sender device so that the sender device sends encrypted frames. The receiving device can decrypt the encrypted frame. Frames used to synchronize internal clocks can also be transmitted encrypted between the devices. This encryption of frames used to synchronize the clocks can cause difficulties in the implementation of the PTP protocol. The duration of encryption and decryption may vary, such that the varying duration for encryption and decryption results in varying latency of transmission of the frames used to synchronize the internal clocks of the devices. The varying latency may reduce the accuracy of the synchronization of the internal clocks of the devices. Decreased accuracy of the synchronization may result in a decreased transmission rate over the network connection.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of the disclosure are defined in the accompanying claims.

DESCRIPTION OF DRAWINGS

Embodiments of the present disclosure will be described in more detail with reference to the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

FIG. 4 shows a simplified flow chart

DESCRIPTION OF EMBODIMENTS

Figure 1:
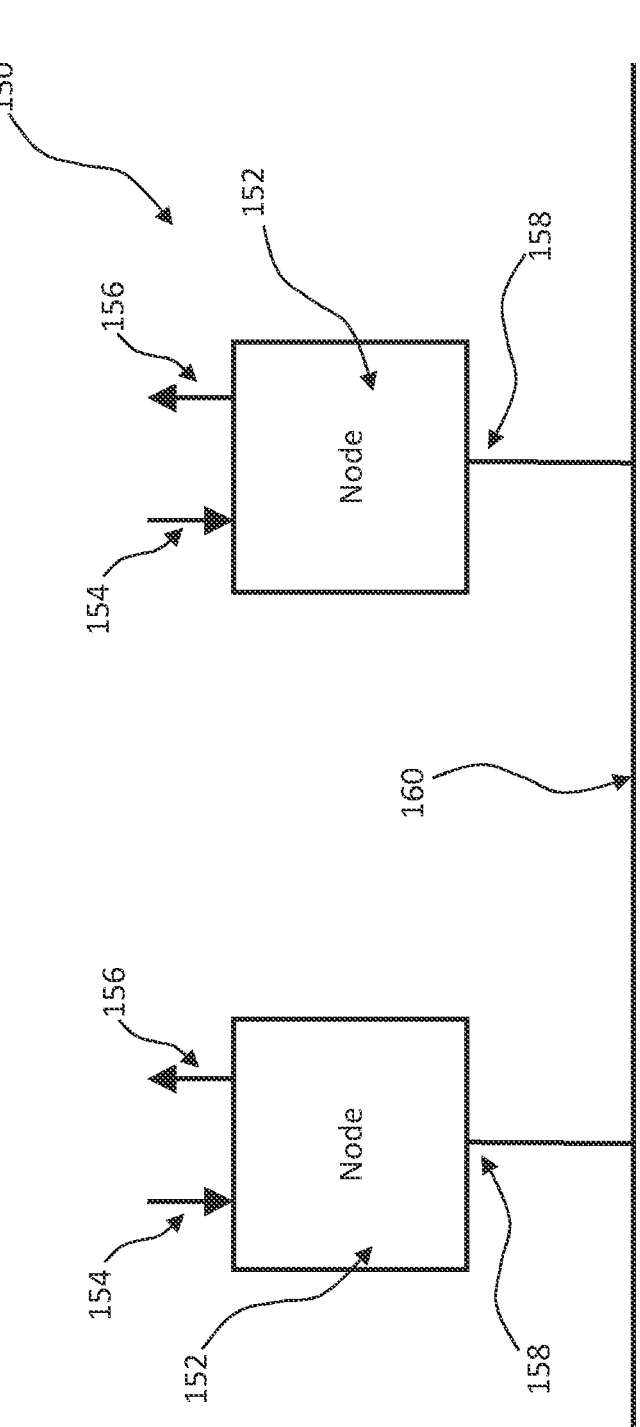
FIG. 1 shows a simplified block diagram of a system.

A communication system 150 may comprise a plurality of nodes 152, each coupled to a network 160. Each node 152 may be configured and/or referred to as a communication device. The network 160 is preferably a wired network, such as an Ethernet network. Each node 152 may comprise a network interface 158. Each node 152 may send messages or receive messages via the network interface 158. The network interface 158 may be configured for bidirectional communication. Each message may be formed according to a predefined network protocol. In addition, each node 152 comprises a receive data, RXD, interface 154 and a transmit data, TXD, interface 156. The RXD interface 154 is used to receive data. The TXD interface 156 was used to send data. The data received via the RXD interface 154 and/or the data sent via the TXD interface 156 may comply with a (further) communication protocol.

The nodes 152 may communicate over the network 160 by the nodes 152 exchanging messages (e.g., frames) over the network 160. A message to be sent over the network 160 may be formed of at least one frame. Each frame may comprise a series of words, each of which may be formed from a plurality of bits. The number of bits per word may be predefined, for example 64 bits per word. The frames may comply with a predefined specification, such as a network protocol, for example, an Ethernet protocol. For certain uses of the system 150, such as time-critical applications, it may be useful to synchronize the internal clocks of the nodes 152. The synchronization may be performed over the network 160. For this purpose, frames may be exchanged between nodes 152, with each frame used for this purpose representing a timestamp. The timestamp of a frame may represent the time according to the internal clock of the node 152 at which the frame is sent by the node. By exchanging frames, each representing a timestamp, between nodes 152, nodes 152 may determine the time duration and consequently the time delay (latency) required for a frame to travel from one node 152 to another node 152. By exchanging frames, each representing a timestamp, between all nodes 152, particularly a predetermined group of nodes 152, the nodes 152 can determine the latency to each other node 152. In addition, the nodes 152 can perform synchronization of internal clocks via the frames, each representing a timestamp. If many nodes 152 are coupled to a network 160 and/or if the nodes 152 are spaced apart, the latency of the frames may vary.

To enable a precise synchronization of the internal clocks of the nodes 152, disturbances within the nodes 152 should be prevented prior to sending frames representing a timestamp. Against this background, the incorporation of a timestamp into a frame should be performed as close as possible to the time at which the frame is sent by a node 152. Accordingly, an internal processing time between the time the timestamp is included in the frame and the time the frame is sent by the node 152 should be very small or minimal. In fact, the internal processing time of a frame in a node 152 may vary considerably. For example, one frame may require encryption prior to transmission, where another frame may not require encryption prior to transmission. Without encryption, the internal processing time turns out to be shorter.

The internal processing time of the frames in the nodes 152 may vary, such that the timestamps represented by the frames may be inaccurate in an unfavorable case and/or may not accurately represent the particular time at which a frame was sent. In light of the foregoing, there is a demand to enable accurate synchronization of the internal clocks of the nodes 152 of a system 150 even if the internal processing times of frames in the nodes vary.

A basic idea for solving the need is based on the knowledge that the maximum, internal processing time of frames in nodes 152 can be estimated. The estimate of the maximum, internal processing time can be used for a buffer unit 104 within the node 152 such that a variation in the internal processing time of a frame in a node is compensated up to the maximum processing time with the effect that the varying internal processing time has no, or at most a much smaller, effect on the accuracy of synchronization of the internal clocks of multiple nodes 152 of a system 150.

Figure 2:
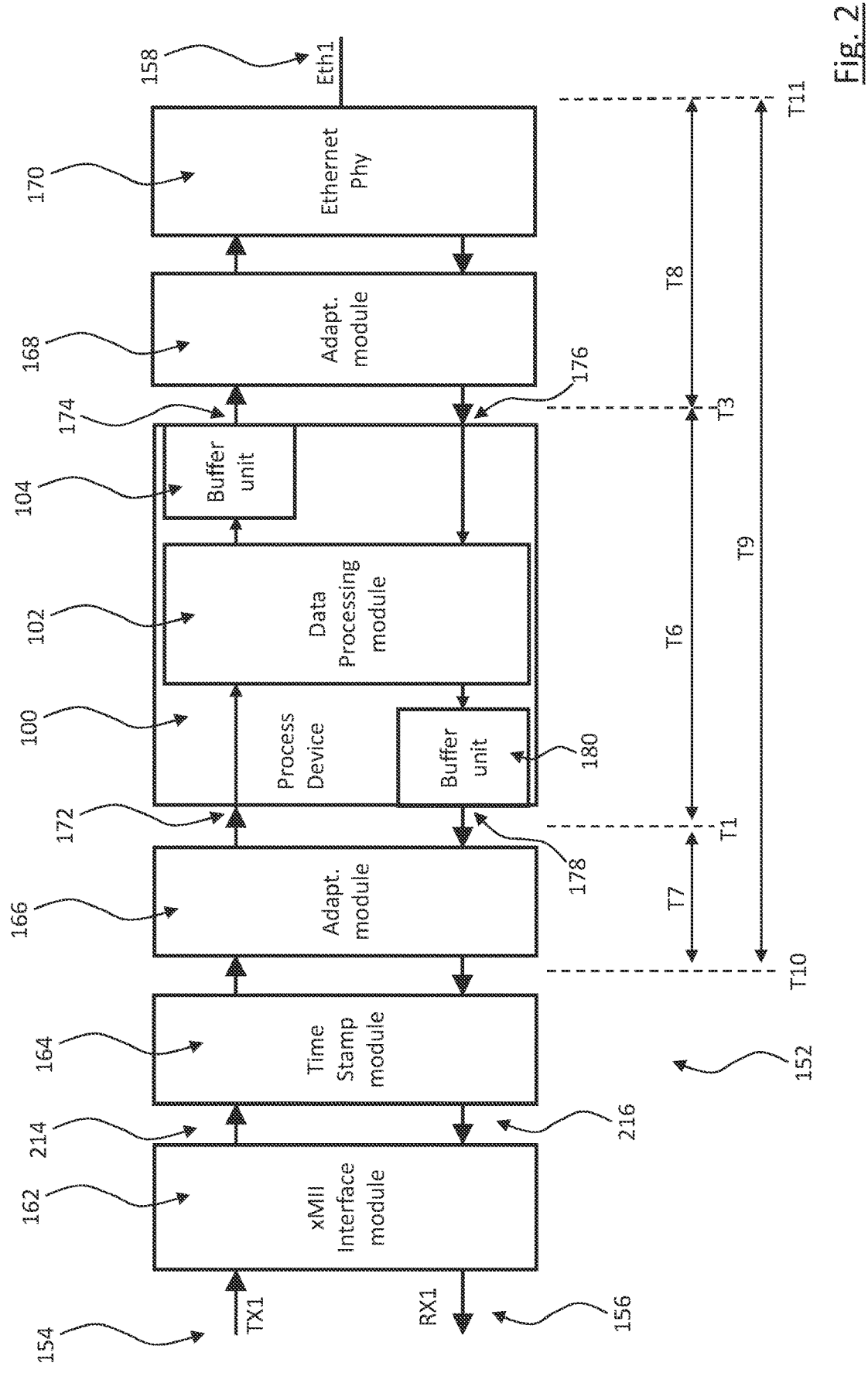
FIG. 2 shows a simplified block diagram of a node.

FIG. 2 schematically illustrates an example of a node 152 that comprises at least one buffer unit 104. In this example, the node 152 comprises an interface module 162, a timestamp module 164, a first adapter module 166, a device 100, a second adapter module 168, and a network module 170 coupled together in a series. The coupling forms a TXD signal path from the TXD interface 154 to the network module 170 and an RXD signal path from the network module 170 to the RXD interface 156.

The interface module 162 may also be referred to and/or configured as a media independent interface (MII) module 162. The interface module 162 may form the TXD interface 154 and the RXD interface 156.

The timestamp module 164 may be configured to modify a frame in the TXD path so that the frame represents a timestamp. The timestamp may be used to synchronize the internal clocks of a plurality of nodes 152 if those plurality of nodes 152 are coupled together via the network 160.

The first adapter module 166 may be configured to divide a frame transmitted over the TXD path 214 to the first adapter module 166 into a plurality of words. Each word comprises a predefined number of bits, such as 64 bits. The first adapter module 166 may further be configured to sequentially transmit the words of the frame to the device 100. In an example, the first adapter module 166 may transmit the bits of a word to the device 100 parallel in time. As a result, the first adapter module 166 may transmit the words of the frame to the device 100 one word at a time.

The interface module 162 and/or the timestamp module 164 may each operate according to the FIFO principle. The FIFO principle may be performed in the interface module and/or in the timestamp module 164 at the bit level, word level, or frame level. The FIFO principle in the interface module 162 and/or in the timestamp module 164 may prevent temporal mixing of data from different frames in the node 152.

The second adapter module 168 may be configured to receive sequentially words of a frame over the TXD path 214. In an example, the second adapter module 168 may be configured to create a data packet from received words. The data packet may be transmitted from the second adapter module 168 to the network module 170 via the TXD path 214.

The network module 170 may be configured to receive the data packet via the TXD path 214. Further, the network module 170 may be configured to modify the data packet so that the data packet complies with a predefined communication protocol, for example a network protocol such as an Ethernet protocol. After modification, the network module 170 may send the modified data packet over the network interface 158.

As can be seen from FIG. 2, the device 100 is coupled between the first adapter module 166 and the second adapter module 168. To continue the TXD path 214, the device 100 comprises a TXD input interface 172 and a TXD output interface 174. The device 100 may be configured to receive words of a frame via the TXD input interface 172. The device 100 may further be configured to transmit (other) words to the second adapter module 168 via the TXD output interface 174.

Figure 3:
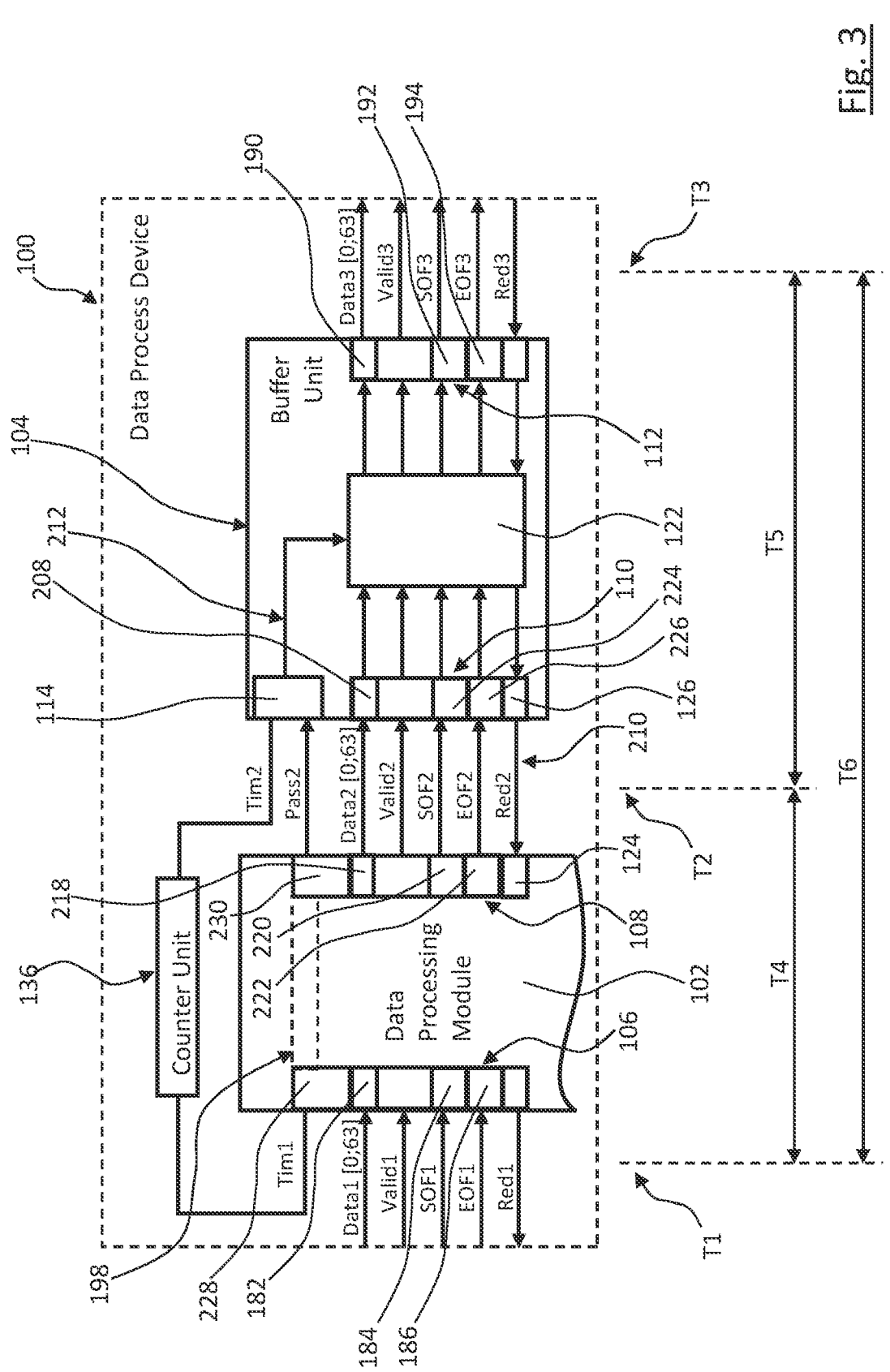
FIG. 3 shows a simplified block diagram of a device.

The node 152 and/or the device 100 may be configured to process words along the RXD path 216 in a similar and/or analogous manner to how the node 152 and/or the device 100 may process words along the TXD path 214. Against this background, FIG. 3 schematically illustrates an example of a portion of the device 100 that relates to the TXD path 214. The device 100 may be configured in an analogous manner for the TXD path 216, even if this portion of the device 100 is not shown in FIG. 3.

The following explanations of the example device 100 of FIG. 3 may apply to a device 100 of node 152. Alternatively or additionally, the following explanations for the device 100 of FIG. 3 may apply if the device 100 in a (further) example does not form part of the node 152. In principle, it is possible that the device 100 may be a separate device 100 that can be used in another technical system or environment. As a result, the following explanations may apply both to an example in which the device 100 is configured as a separate device 100 and to an example in which the device 100 forms a part of the node 152. If advantageous explanations, preferred features, technical effects or advantages are explained below for an example of the device 100 in which the device 100 forms a part of the node 152, the corresponding explanations, preferred features, technical effects and/or advantages may also apply in an analogous manner to an example of the device 100 in which the device 100 does not form part of the node 152 but may be configured separately.

The device 100 comprises a data processing module 102. The data processing module 102 may form a physical and/or logical part of the device 100. The data processing module 102 may be configured to process data. The data processing module 102 may comprise a processing unit for processing the data. Therefore, the data processing module 102 may also be referred to and/or configured as a processor unit and/or a processor module.

The data processing module 102 comprises an interface 106, referred to as the module input 106. The module input 106 may form the TXD input interface 172 of the device 100. Via the module input 106, the data processing module 102 may sequentially receive multiple words of the same frame. The frame may be referred to as the first frame or the first input frame. Each word may comprise a predefined number of bits, such as 64 bits. In an example, the module input 106 may comprise a data port 182 through which all bits of a (single) word are simultaneously transmittable to the module input 106 and/or the data processing module 102. In an example, the data port 182 may comprise a "width" corresponding to the predefined number of bits of a word. Via the data port 182 of the module input 106, the data processing module 102 may receive a frame where the words of the frame are received sequentially word by word. The module input 106 may comprise other ports, such as the SOF port 184 and/or the EOF port 186. A start signal SOF1, which represents the time of an reception of a first bit of a frame at the data port 182, may be received via the SOF port 184. An end signal EOF1, which represents a time of the reception of the last bit of a frame at the data port 182, may be received via the EOF port 186.

A word received by the data processing module 102 via the module input 106 and/or the data port 182 may also be referred to as an input word. The data processing module 102 may be configured to process the input word and to form an output word from the processed input word. The output word may comprise a defined number of bits. In an example, each output word comprises the same number of bits as the input word based on which the output word was formed. To process an input word, the data processing module 102 may comprise a processing unit. In an example, the data processing module 102 may be configured to process multiple input words simultaneously. Processing an input word may comprise multiple processing steps and/or multiple processing cycles.

The data processing module 102 comprises another interface 108, referred to as the module output 108. The module output 108 may be used by the data processing module 108 to sequentially send multiple output words of the same frame. Multiple output words may belong to a frame, which may also be referred to as an output frame, particularly a first output frame. In an example, the module output 108 may comprise a data port 218 through which all bits of a (single) output word may be sent simultaneously. In an example, the data port 218 may comprise a "width" corresponding to the predefined number of bits of an output word. The data processing module 102 may send an output frame where the output words of the output frame are sent sequentially via the data port 218. The module output 110 may comprise other ports, such as the SOF port 220 and/or the EOF port 222. A start signal SOF2, which represents the time of a transmission of a first bit of a frame at the data port 218, may be sent via the SOF port 220. An end signal EOF2, which represents a time of the transmission of the last bit of a frame at the data port 218, may be received via the EOF port 222.

The device 100 comprises the buffer unit 104. The buffer unit 104 may form a physical and/or logical part of the device 100. The buffer unit 104 comprises a memory 122. The memory 122 may be configured to store data, such as bits of an output word. The buffer unit 104 may further comprise a control unit (not shown) configured to control the memory 122.

The buffer unit 104 comprises an interface 110, also referred to as the buffer input 110. The module output 108 of the data processing module 102 is coupled to the buffer input 110 of the buffer unit 104. The buffer unit 104 may receive an output word via the buffer input 110. In an example, the buffer input 110 may comprise a data port 208 through which all bits of an output word may be received simultaneously. In an example, the data port 208 may comprise a "width" corresponding to the predefined number of bits of an output word. The buffer unit 104 may sequentially receive output words from the module output 108 and/or from the associated data port 218 at the buffer input 110 and/or its associated data port 208. The buffer input 110 may comprise other ports, such as the SOF port 224 and/or the EOF port 226. The start signal SOF2 may be received via the SOF port 224. The end signal EOF2 may be received via the EOF port 226.

A received output word may be stored by the buffer unit 104 in the memory 122. The memory 122 may be configured to store the bits of an output word. In an example, the buffer unit 104 may be configured to store up to a fixed number of words, such as a single word only. The duration while an output word is stored in the memory 122 may be controlled by the buffer unit 110, in particular by the control unit of the buffer unit 110.

The buffer unit 104 comprises another interface 114, also referred to as the input interface 114. The buffer unit 104 is configured to receive further data, referred to as run time data, via the input interface 114. The run time data represents a duration of time, referred to as run time T4, between a first time T1, at which the data processing module 102 receives an input word via the module input 106, and a second time T2, at which an output word is transmitted from the data processing module 102 via the module output 108 to the buffer input 110 of the buffer unit 104. In other words, the run time data preferably represents a period of time, referred to as run time T4, from the a first time T1 (in particular first point in time T1) and the second time T2 (in particular the second point in time T2). The output word is generated by the data processing module 102 based on the received input word. In an example, the run time data may represent both the first time T1 and the second time T2. In an example, a representation of the first and second times T1, T2 may preferably also to be understood as a representation of the duration in time between the first time T1 and the second time T2. As a result, the run time data may represent the first and second times T1, T2 and/or (as a result also) the run time T4.

In principle, a variety of technical possibilities are conceivable for generating the run time data, so that the generation of the run time data is not limited to a single technical solution. In an example not shown, two sensors can be used to measure with a first sensor the first time T1 of an reception of an input word at the module input 106 and with a second sensor the second time T2 of a transmission of an output word from the module output 108 to the buffer input 110. Together, the two sensors may generate and transmit the run time data to the transmitter input 114 of the buffer unit 104. In another example that is schematically shown in FIG. 3, the data processing module 112 may comprise a through path 198. The data processing module 102 may be configured to process data in the through path 198 parallel in time with a received input word. Data may be input to the through path 198 via a path input port 228. A path output port 230 may be used to exit the through path 198 and transmit data. By using a counter unit 136 coupled to both the path input port 228 and the input interface 114 of the buffer unit 104 while the path output port 230 is also coupled to the input interface 114, run time data representing the run time T4 may be transmitted to the input interface 114.

Previously, it was explained that the exchange of frames, each representing a timestamp, between nodes 152 of a system 150 may be used to achieve synchronization of the internal clocks of nodes 152. In order to enable precise synchronization of the internal clocks of the nodes 152, a temporal variation of the temporal duration T9 between the time T10 of generation of a timestamp in a node 152 and the time T11 of sending and/or leaving of a frame by the node 152, which frame represents the generated timestamp, should be prevented.

In FIG. 2, an example of a node 152 is shown schematically. The node 152 comprises a timestamp module 164. The timestamp module 164 may be configured to modify (the bits of) a frame such that the modified frame represents the timestamp generated by the timestamp module 164. In an example, the first word of the modified frame may represent the timestamp. Via the TXD signal path 214, the timestamp passes from the timestamp module 164 to the network interface 158, at which the timestamp may be represented by a (different) frame that satisfies a network protocol, such as an Ethernet protocol. The other frame may be referred to and/or configured as a data packet.

A variation of the temporal duration T9 can be prevented if the temporal durations T6, T7, T8 do not vary in time, respectively. In the prior art, an adapter module 166, another adapter module 168 and a network module 170 are already available, each of which requires a constant time or a duration that does not vary in time for processing data, such as words of a frame. Against this background, it can be assumed that each of the temporal durations T7 and T8 do not vary in time. Against this background, there is a need to design the device 100 such that the temporal duration T6 is preferably not subject to temporal variation. The time duration T6 may also be referred to as the reference time T6.

In FIG. 3, the reference time T6 is shown schematically. The reference time T6 is the sum of the run time T4 and the delay time T5. The run time T4 is preferably the duration in time between the time T1 of receiving an input word by the data processing module 102 and the time T2 of transmitting an output word from the data processing module 102 to the buffer unit 104. The delay time T5 is preferably the duration in time between the time T2 and a time T3 at which the previously received output word is sent by the buffer unit 104.

The maximum time duration of the run time T4 may be estimated. In an example, it may be assumed that the maximum temporal duration of the run time T4 occurs if a frame and/or its associated input words must be decrypted to generate corresponding output words. The run time T4 may be shorter if a frame's words do not need to be decrypted to generate output words. The variation of the run time T4 may be compensated by the delay time T5. The buffer unit 104 may also be referred to as the latency compensation unit 104. Using the run time data received by the buffer unit 104 via the input interface 114, the buffer unit 104 may determine the actual run time T4. Depending on the actual run time T4, the buffer unit 104 may adjust the duration while an output word is stored in the memory 122 so that the delay time T5 is short if the run time T4 is long and is long if the run time T4 is short. In other words, the buffer unit 104 may be configured to adjust the delay time T5 by adjusting the duration while an output word is stored in the memory 122 such that the sum of the run time T4 and the delay time T5 is preferably exactly the predefined reference time T6. As a result, the reference time T6 may be a constant temporal duration that is not subject to temporal variation. As another result of the constant temporal reference time T6, it may be assumed that the temporal duration T9 is also constant in time as well. The temporal duration T9 may also be referred to as the process time T9. The constant process time may ensure that precise synchronization of the internal clocks of the nodes 152.

To send an output word, the buffer unit 104 comprises an interface 112, referred to as the buffer output 112. The buffer output 112 may form the TXD output interface 174 of the device 100. The buffer unit 104 may send an output word (previously) stored in the memory 122 via the buffer output 112. The time T3 at which the buffer unit 104 sends an output word stored in the memory 122 may be controlled by the buffer unit, preferably by a control unit of the buffer unit 104. In an example, the buffer unit 104 may be configured to determine the time T3 depending on the run time T4 represented by the run time data. In another example, the buffer unit 104 may be configured to determine the time T3 depending on the run time T4 such that a sum of the delay time T5 and the run time T4 is the predefined reference time T6. Against this background, the delay time T5 may be understood to correspond to a time duration that is predefined reference time T6 minus the running time T4. The predefined reference time T6 may be stored by the buffer unit 112. Once the buffer unit 112 receives information about the run time T4 via the run time data, the buffer unit 104 may determine the delay time T5. Against this background, the buffer unit 112 may send the output word 112 at the time T3 such that the determined delay time T5 occurs between the time T2 and the time T3.

In an example, the buffer output 112 may comprise a data port 190 through which all bits of the (single) output word may be sent simultaneously. In an example, the data port 190 may comprise a "width" corresponding to the predefined number of bits of an output word. The buffer unit 104 may send an output frame where the output words of the output frame are sent sequentially via the data port 190. The buffer output 112 may comprise other ports, such as the first SOF port 192 and/or the EOF port 194. A start signal SOF3, which represents the time of a transmission of a first bit of a frame at the data port 190, may be sent via the SOF port 192. An end signal EOF3, which represents a time of the transmission of the last bit of a frame at the data port 190, may be received via the EOF port 194.

In light of the foregoing discussion, the data processing module 102 is preferably configured to perform the following steps A1), A2), and A3):

Steps A1): Receiving a first input word of a first frame via the module input 106 at a first time T1, the first input word comprising a plurality of bits.

Step A2): Processing the first input word into a first output word.

Step A3): Transmit the first output word to the buffer input 110 of the buffer unit 104 via the module output 108 at a second time T2.

Steps A1) to A3) may be performed in the order indicated.

In addition, the buffer unit 104 is preferably configured to perform the following steps B1), B2), and B3):

Step B1): Storing the first output word in the memory 122 of the buffer unit 104.

Step B2): Receiving data referred to as run time data via the input interface 114 of the buffer unit 104, the run time data representing a run time T4 between the first time T1 and the second time T2.

Step B3): Transmitting the first output word via the buffer output 112 at a third time point T3, such that a delay time T5, which corresponds to the predefined reference time T6 minus the run time T4, occurs between the second time T2, at which the first output word is transmitted to the buffer input 110, and the third time point T3.

Steps B1) to B3) may be performed in the order indicated.

As a technical effect, the run time T4 and the following delay time T5 add up to the predefined (and desired constant) reference time T6. As a result, the same reference time T6 is always required by the device 100 to generate and/or send an (arbitrary) first output word based on an (arbitrary) received first input word.

In the adapter module 166, a frame may be divided into a plurality of words. The words may be transmitted sequentially along the TXD path 214 to the device 100. In an example, it may be sufficient to perform step B3) for the first word of the first frame. All further words of the same frame follow word by word the first word along the TXD path 214, so that for all further words of the same frame have the same predefined (and desired constant) reference time T6. As an effect, the constant reference time T6 at the device 100 can be ensured. As a further result, the same predefined reference time T6 may be ensured for the processing of each word of a frame by the device 100. Such a constant, predefined reference time T6 may provide a high utilization of the network 160 and/or a high transmission speed from node 152 to node 152.

In an example, the data processing module 102 may be configured to perform at least one of the following steps A2.1), A2.2) and A2.3) as sub-step(s) of step A2):

Step A2.1): if the first input word is encrypted, decrypting that first input word according to a predefined protocol such that the first output word is formed from the decrypted first input word.

Step A2.2): if the first input word is unencrypted, to forward the first input word preferably unchanged as the first output word to the module output 108.

Step A2.3): generate the first output word by modifying and/or processing the first input word.

The data processing module 102 may be configured to process a plurality of words of the same frame simultaneously. A plurality of words of the frame may be received sequentially by the data processing module 102 via the module input 106. The data processing module 102 may be configured to detect whether at least one word of the frame is encrypted based on one of the plurality of words of the frame. In an example, the data processing module 102 may detect based on the second word or third word of a frame whether any of the other words of the frame are encrypted. Provided that the data processing module 102 has detected that a word is encrypted, the data processing module 102 may perform step A2.1) in an analogous manner for the encrypted word.

In an example, the data processing module 102 may detect that the first input word is encrypted. In this case, the data processing module 102 will perform step A2.1) in and/or as step A2). If only step A2.1) is performed in step A2), step A2.1) may replace step A2). Decrypting a word may be understood as an example for processing the word.

In another example, the data processing module 102 may detect that the first input word is unencrypted. In this case, the data processing module 102 will perform step A2.2) in and/or as step A2). If only step A2.2) is performed in step A2), step A2.2) may replace step A2). Forwarding a word may be understood as an example for processing the word.

In another example, the data processing module 102 may perform additional processing steps in step A2, in addition to decrypting and/or forwarding, to generate the output word based on the input word. In this case, step A2.3) may be performed in and/or as step A2). Step A2.3) may be combined with step A2.1) and/or with step A2.2).

In another example, the data processing module 102 may be configured to, if an input word is encrypted according to the MACSec protocol, decrypt the respective input word according to the MACSec protocol such that the output word is formed by the decrypted input word. The corresponding decryption according to the MACSec protocol may be performed in step A2) and/or in step A2.1).

The module output 108 of the data processing module 102 may comprise another port 124, which may also be referred to as the control input 124. Via the control input 124, the data processing module 102 may receive a signal Red2, which may also be referred to as a ready signal Red2. The ready signal Red2 may be generated by the buffer unit 104. In an example, the buffer input 110 comprises another port 126, which may be referred to as the control output 126. The control output 126 may be coupled to the control input 124. The ready signal Red2 generated by the buffer unit 104 may represent the time T3, such as by a signal change. The ready signal Red2 may have a predefined signal level. At time T3, the delay time T5 of the first word in the memory 122 of the buffer unit 104 ends, so that the first word is sent via the buffer output 112. Subsequently, another word may be received at the buffer unit 104 via the buffer input 110. Therefore, the buffer unit 104 may be configured to send the ready signal Red2 to the control input 124 of the data processing module 102 at and/or from the third time T3 via the control output 126. If the data processing module 102 receives the ready signal Red2, the data processing module 102 may sequentially transmit the other words of the first frame to the buffer input 110 of the buffer unit 104 via the module output 108. In simplified terms, the ready signal Red2 can be understood approximately as meaning that, from the generation of the ready signal Red2, the (further) words of the first frame are processed word by word by the device 100. The processing of each word takes the predefined reference time T6.

In an example, the buffer unit 104 is configured to perform the following step B4): transmit the ready signal Red2 at and/or from the third time T3 via the control input 126 to the control input 124 of the data processing module 102. The ready signal Red2 represents an indication to transmit at least one further word to the buffer unit 104. The data processing module 102 may interpret the ready signal Red2 based on the indication such that, from the time the ready signal Red2 is received, the further words of the first frame are transmitted word by word to the buffer unit 104.

In another example, the data processing module 102 is configured to perform steps A4), A5), and A6):

Step A4): Receiving at least one further input word of the first frame via the module input 106 after the first input word is received.

Step A5): Processing the further input word into a further output word.

Step A6): Transmitting the at least one further output word via the module output 108 to the buffer input 110 of the buffer unit 104 in response to and/or only during the reception of the ready signal Red2 at the control input 124 of data processing module 102.

Steps A4) through A6) may be performed sequentially as a step group. The data processing module 102 may be configured to perform the step group for each additional input word of the frame. The step groups may be performed partially overlapping in time.

Preferably, step A6) is performed only while the ready signal Red2 is received, so that the ready signal Red2 can be used by the buffer unit 104 to control when further output words are transmitted to the buffer unit 104. The ready signal Red2 can therefore also be used to prevent further output words from being transmitted to the buffer unit 104 while the first output word is stored in the memory unit 122 during the delay time T5. Only if the first output word is sent, the further output words are transmitted word by word to the buffer unit 104. Preferably, the output words form a closed series such that an output frame is formed from the output words.

In an example, the step group (comprising steps A4) to A6)) may be performed parallel in time and/or overlapping in time with steps A2), and A3). In an example, the data processing module 102 may receive additional input words of the first frame while other input words that have already been received are processed by the data processing module 102, such as for decryption and/or for forwarding to the module output 108 for transmission to the buffer unit 104.

In an example, the data processing module 102 may be configured to perform at least one of the following steps A5.1), A5.2), and A5.3) as sub-step(s) of step A5):

Step A5.1): if the further input word is encrypted, decrypting that further input word according to a predefined protocol such that a further output word is formed from the decrypted further input word.

Step A5.2): if the further input word is unencrypted, forwarding the further input word preferably unchanged as a further output word to the module output 108.

Step A5.3): generate the further output word by modifying and/or processing the further input word.

For steps A5.1) to A5.3), reference is made to the preceding explanations, preferred features, technical effects and advantages in an analogous manner as already explained in connection with steps A2.1) to A2.3).

However, the at least one further output word should be sent to the buffer unit 104 only if the first output word has been sent previously by the buffer unit 104 via the buffer output 112. The sending of the first output word is performed at time T3. Thereafter, the ready signal Red2 is sent from the buffer unit 104 to the data processing module 102. The data processing module 102 may be configured to prevent transmission of the at least one further output word until the ready signal Red2 is received.

If multiple input words of the same frame are received sequentially by the data processing module 102 via the module input 106, the data processing module 102 may process the input words based on the FIFO principle. The order of the words of the same frame may therefore be maintained in a process direction between the module input 106 to the buffer output 112.

In an example, the first frame may be formed by an Ethernet frame. The Ethernet frame may also be referred to and/or configured as an Ethernet packet.

Generally, the data processing module 102 may be configured to detect the first bit of a frame. In an example, the first bit of the frame is formed by the first bit of the first word of the first frame.

Previously, it was discussed that the module input 106 may comprise a SOF port 184. The data processing module 102 may receive a start signal SOF1 via the SOF port 184.

The start signal SOF1 may represent a start bit. The start bit is transmitted by the start signal SOF1 to the data processing module 102 at the time T1. The data processing module 102 may be configured to receive both the start bit represented by the start signal SOF1 and the first bit of the first input word in parallel in time via the module input 106. The data processing module 102 may further be configured to detect the time T1 by a sensing of the time of reception of the start bit based on the start signal SOF1. In other words, the time T1 may be detected particularly easily based on the start signal SOF 1.

The buffer unit 104 may receive the run time data via the input interface 114 of the buffer unit 104. The run time data may represent both the first time period T1 and the second time period T2. The first time period T1 refers to the reception of the first input word by the data processing module 102. The second time period refers to the transmission of the first output word from the data processing module 102 to the buffer unit 104.

In an example, the buffer unit 104 may be configured to calculate the run time T4 based on the first and the second times T1, T2. Once the run time T4 is calculated, the buffer unit 104 may subtract the run time T4 from the reference time T6 to determine the remaining delay time T5. The buffer unit 104 may be configured to buffer (only) the first output word for exactly the delay time T5. Subsequent output words of the same frame may be forwarded by the buffer unit 104 without applying the delay time T5.

In an example, the run time data may be divided into two parts. As a result, the run time data may be formed of a first data part and a second data part. The buffer unit 104 may be configured to receive the two data parts separately via the input interface 114. In an example, the first data part may represent the first time T1. The second data part may represent the second time T2.

The two data parts may come from different sources. For example, a first sensor may be used for the device 100 to detect the first time T1. The first sensor may detect the time of receiving the first input word and/or the time of receiving the start bit (represented by the SOF1 signal). The device 100 may comprise another sensor to detect the time of transmission of the first output word from the data processing module 102 to the buffer unit 104. The first sensor may generate and transmit the first data part to the input interface 114. The second sensor may generate and transmit the second data part to the input interface 114. The two sensors may be coupled to each other. The two sensors may be configured to transmit the two data parts to the input interface 114 of the buffer unit 104 in parallel in time. The buffer unit 104 may be configured to receive the first data part and the second data part in parallel in time.

In another example, the data processing module 102 may be configured to generate the first data part representing the first time T1. The input interface 114 of the buffer unit 104 may be coupled to the module output 108 of the data processing module 102. The data processing module 102 may further be configured to transmit the first data part to the input interface 114 of the buffer unit 104.

In an example, the device 100 may comprise a counter unit 136, such as a free counter. The input interface 114 of the buffer unit 104 may be coupled to the counter unit 136. The counter unit 136 may be configured to generate the second data part representing the second time T2. The counter unit 136 may transmit the second data part to the input interface 114 of the buffer unit 104. In an example, the counter unit 136 is configured to periodically generate timestamps. For each generated timestamp, the counter unit

136 may generate a second data part representing the respective timestamp and transmit the second data part to the input interface 114 of the buffer unit 104. Second data parts may be periodically transmitted from the counter unit 136 to the input interface 114 of the buffer unit 104. The buffer unit 104 may be configured to solely accept, select, and/or receive the second data part that is received in parallel time with the first data part. The corresponding, second data part represents the time T2 at which the first output word is transmitted from the data processing module 102 to the buffer unit 104.

In an example, the counter unit 136 may be coupled to the module input 106 of the data processing module 102. The data processing module 102 may be configured to generate a third data part representing the respective timestamp for each generated timestamp. The counter unit 136 may transmit each third data part to the module input 106. In an example, the counter unit 136 transmits each third data part to the path input port 228 of the module input 106. The data processing module 102 is configured to process the third data part received at the path input port 228 in parallel time with the first input word at the data port 182. The third data part received by the data processing module 102 in parallel in time with the first input word may be referred to as the first data part. As a result, the data processing module 102 may process the first data part in parallel in time with the step A2). In the step A2, the data processing module generates the first output word based on the first input word. The data processing module 102 may further be configured to transmit the first data part and the first output word to the buffer unit 104 in parallel in time. In an example, the data processing module 102 may comprise the through path 198 that forms a processing path from the path input port 228 of the module input 106 to the path output port 230 of the module output 108. The data processing module 102 may transmit the first data part from the path output port 230 to the input interface 114 of the buffer unit 104. The first data part represents the time T1 at which the data processing module 102 received the first input word via the module input 106. Transmission of the first data part to the input interface 114 of the buffer unit 104 also simultaneously sets the time at which the buffer unit 104 accepts and/or selects a second data part to be transmitted from the counter unit 136 to the input interface 114 of the buffer unit 104. The selected and/or accepted second data part represents the time at which the first output word is transmitted from the data processing module 102 to the buffer unit 104. As a result, the input interface 114 of the buffer unit 104 receives both the first data part and the second data part in parallel in time. By receiving the two data parts, the buffer unit receives information about the first time T1 and the second time T2. From the two times T1, T2, the buffer unit can determine the run time T4. The reference time T6 is predefined and may be stored by the buffer unit 104. The buffer unit 104 can determine the delay time T5 from the reference time T6 and the processing time T4.

Referring to FIG. 7, an example of a method for a device 100 is schematically illustrated by a flow chart. The device 100 comprising a data processing module 102, and a buffer unit 104, wherein the data processing module 102 comprises a module input 106, and a module output 108, wherein the buffer unit 104 comprising a buffer input 110, a buffer output 112, and an input interface 114, wherein the module output 108 is coupled to the buffer input 110, and wherein the method comprising the steps:

A) receiving a first input word of a first frame via the module input 106 at a first time T1, the first input word comprising a plurality of bits, B) Processing the first input word into a first output word at the data processing module 102, C) transmitting the first output word to the buffer input 110 of the buffer unit 104 via the module output 108 at a second time T2, D) storing the first output word in a memory 122 of the buffer unit 104, E) receiving data, referred to as run time data, via the input interface 114 of the buffer unit 104, the run time data representing a run time T4 between the first time T1 and the second time T2, and F) transmitting the first output word via the buffer output 112 at a third time T3 such that a delay time T5, which corresponds to a predefined reference time T6 minus the run time T4, is created between the second time T2, at which the first output word is transmitted to the buffer input 110, and the third time T3.

For the method, reference is made to the preceding explanations, preferred features, technical effects and advantages in an analogous manner as already explained in connection with the device 100.

Although the described exemplary embodiments disclosed herein focus on devices, systems, and methods for using same, the present disclosure is not necessarily limited to the example embodiments illustrate herein.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A device comprising:
a data processing module; and a buffer unit,
wherein the data processing module comprises a module input, and a module output,
wherein the buffer unit comprising a buffer input, a buffer output, and an input interface,
wherein the module output is coupled to the buffer input,
wherein the data processing module is configured to perform the following steps a1) to a3):
   a1) receive a first input word of a first frame via the module input at a first time, the first input word comprising a plurality of bits,
   a2) process the first input word into a first output word, and
   a3) transmit the first output word to the buffer input of the buffer unit via the module output at a second time, and
wherein the buffer unit is configured to perform the following steps b1) to b3):
   b1) store the first output word in a memory of the buffer unit,
   b2) receive run time data, via the input interface, the run time data defining a run time that represents the duration between the first time and the second time, and
   b3) transmit the first output word via the buffer output at a third time such that a delay time is created between the second time, at which the first output word is transmitted to the buffer input, and the third time, wherein the delay time is dynamically adjusted by the buffer unit by calculating the delay time as the difference between a predetermined reference time and the run time.

2. The device of claim 1, wherein the data processing module is further configured to perform at least one of the following steps a2.1) and a2.3) as a sub-step of step a2):
   a2.1) if the first input word is encrypted, decrypting the first input word according to a predefined protocol, such that the first output word is formed from the decrypted, first input word;
   a2.2) if the first input word is unencrypted, forwarding the first input word as the first output word to the module output; and
   a2.3) creating the first output word through modifying and/or processing the first input word.

3. The device of claim 2,
wherein the data processing module comprises a control input,
wherein the buffer unit comprises a control output, which is coupled to the control input of the data processing module,
wherein the buffer unit is further configured
   b4) to transmit a signal, referred to as ready signal, at and/or from the third time via the control output to the control input of the data processing module, wherein the ready signal representing an indication to transmit at least one further word to the buffer unit,
wherein the data processing module is further configured to perform the following steps a4) to a6)
   a4) to receive at least one further input word of the first frame via the module input after the first input word,
   a5) process the further input word into a further output word, and
   a6) transmit the at least one further output word to the buffer input of the buffer unit via the module output in response to and/or only while receiving the ready signal at the control input of the data processing module.

4. The device of claim 3, wherein the data processing module is configured to prevent transmission of the at least one further output word until the ready signal is received.

5. The device claim 4, wherein the data processing module is configured, if a plurality of further input words are received, to sequentially transmit the corresponding output words one after the other.

6. The device of claim 1, wherein the data processing module is configured to receive both a start bit and a first bit of the first word in parallel via the module input, wherein the data processing module is configured to set the first time by the time of reception of the start bit.

7. The device of claim 1, wherein the data processing module is configured, if an input word is encrypted according to the MACSec protocol, to decrypt the respective input word according to the MACSec protocol, such that the decrypted input word forms an output word.

8. The device of claim 1, wherein the run time data represents both the first time of reception of the first input word by the data processing module and the second time of transmission of the first output word to the buffer input via the module output.

9. The device of claim 8, wherein the run time data is formed of a first data part and a second data part, wherein the first data part represents the first time of reception of the first input word by the data processing module, and wherein the second data part represents the second time of transmission of the first output word to the buffer input via the module output.

10. The device of claim 9, wherein the buffer unit is configured to receive the first data part and the second data part parallel in time.

11. The device of claim 9, wherein the input interface of the buffer unit is coupled to the data processing module, and wherein the data processing module is configured to transmit the first data part to the input interface.

12. The device of claim 11, wherein the device comprises a counter unit, wherein the input interface of the buffer unit is coupled to the counter unit, and wherein the counter unit is configured to transmit the second data part to the input interface.

13. The device of claim 12, wherein the counter unit is configured to continuously generate time stamps, generate for each time stamp a second data part representing the respective time stamp, and transmit the respective second data part to the input interface of the buffer unit.

14. The device of claim 13, the counter unit is coupled to the module input of the data processing module, and wherein the counter unit is configured to generate for each time stamp a third data part representing the respective time stamp and to transmit the respective third data part to the module input, wherein the third data part received by the data processing module parallel in time with the first input word is referred to as the first data part, and wherein the data processing module is configured to transmit the first data part parallel in time with the first output word to the buffer unit.

15. A method for a device comprising a data processing module, and a buffer unit, wherein the data processing module comprises a module input, and a module output, wherein the buffer unit comprising a buffer input, a buffer output, and an input interface, wherein the module output is coupled to the buffer input, and wherein the method comprising the steps of:
  A) receiving a first input word of a first frame via the module input at a first time, the first input word comprising a plurality of bits,
  B) processing the first input word into a first output word at the data processing module,
  C) transmitting the first output word to the buffer input of the buffer unit via the module output at a second time,
  D) storing the first output word in a memory of the buffer unit,
  E) receiving run time data, via the input interface of the buffer unit, the run time data defining a run time that represents the duration between the first time and the second time, and F) transmitting the first output word via the buffer output at a third time such that a delay time is created between the second time, at which the first output word is transmitted to the buffer input, and the third time, wherein the delay time is dynamically adjusted by the buffer unit by calculating the delay time as the difference between a predetermined reference time and the run time.

16. The method of claim 15, wherein the method comprises at least one of the following steps a2.1) and a2.3) as a sub-step of step a2):
  a2.1) if the first input word is encrypted, the data processing module decrypting the first input word according to a predefined protocol, such that the first output word is formed from the decrypted, first input word;
  a2.2) if the first input word is unencrypted, the data processing module forwarding the first input word as the first output word to the module output; and
  a2.3) the data processing module creating the first output word through modifying and/or processing the first input word.

17. The method of claim 15, wherein the data processing module comprises a control input, wherein the buffer unit comprises a control output, which is coupled to the control input of the data processing module, wherein the method further comprising the steps:
  b5) the buffer unit transmitting a signal, referred to as ready signal, at and/or from the third time via the control output to the control input of the data processing module, wherein the ready signal representing an indication to transmit at least one further word to the buffer unit,
  a7) the data processing module receiving at least one further input word of the first frame via the module input after the first input word,
  a8) the data processing module processing the further input word into a further output word, and
  a9) the data processing module transmitting the at least one further output word to the buffer input of the buffer unit via the module output in response to and/or only while receiving the ready signal at the control input of the data processing module.

18. The method of claim 17, wherein the data processing module prevents the transmission of the at least one further output word until the ready signal being is received.

19. The method of claim 18, wherein, if a plurality of further input words are received, the data processing module sequentially transmits the corresponding output words.

\* \* \* \* \*